(12) United States Patent
Rafique et al.

(10) Patent No.: US 9,407,300 B2
(45) Date of Patent: Aug. 2, 2016

(54) ADJACENT-CHANNEL INTERFERENCE AND SPUR HANDLING IN WIRELESS COMMUNICATIONS

(71) Applicant: QUALCOMM Incorporated, San Diego, CA (US)

(72) Inventors: Hassan Rafique, Farnborough (GB); Divaydeep Sikri, Woking (GB); Nico De Laurentiis, Farnborough (GB); Cetin Altan, Farnborough (GB); Antonio de Angelis, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/630,411

(22) Filed: Feb. 24, 2015

(65) Prior Publication Data
US 2016/0112079 A1   Apr. 21, 2016

Related U.S. Application Data

(60) Provisional application No. 62/064,123, filed on Oct. 15, 2014, provisional application No. 62/064,113, filed on Oct. 15, 2014.

(51) Int. Cl.
*H04B 1/10* (2006.01)
*H04L 27/26* (2006.01)
*H04B 17/354* (2015.01)

(52) U.S. Cl.
CPC ............ *H04B 1/1027* (2013.01); *H04B 17/354* (2015.01); *H04L 27/2627* (2013.01); *H04B 2001/1045* (2013.01)

(58) Field of Classification Search
CPC ............... H04B 1/1027; H04B 17/354; H04B 2001/1045; H04L 27/2627
USPC .......................... 455/63.1, 423–425, 450–453
See application file for complete search history.

(56) References Cited

U.S. PATENT DOCUMENTS

7,672,383 B2 * 3/2010 Namgoong .......... H04B 1/1027
                                                 375/260
7,822,385 B2 * 10/2010 Lopez .................. H04B 1/1036
                                                 455/254

(Continued)

FOREIGN PATENT DOCUMENTS

EP         2403196 A1    1/2012
WO    WO-2007050198 A1   5/2007
WO    WO-2008055094 A2   5/2008

OTHER PUBLICATIONS

International Search Report and Written Opinion—PCT/US2015/051780—ISA/EPO—Dec. 14, 2015.

*Primary Examiner* — Sharad Rampuria
(74) *Attorney, Agent, or Firm* — Loza & Loza LLP

(57) ABSTRACT

Aspects of the present disclosure provides a wireless communication apparatus configured to handle adjacent-channel interference (ACI) and spur. The apparatus receives a signal utilizing a communication interface. The apparatus is configured to perform a single discrete Fourier transform (DFT) on the signal to generate frequency domain data. The apparatus is further configured to determine respective energy of a plurality of adjacent channels of the signal utilizing the frequency domain data. The apparatus is further configured to determine one or more potential interfering channels among the adjacent channels, wherein each of the potential interfering channels has an energy greater than a qualifying threshold. The apparatus is further configured to identify one or more dominant interfering channels from among the potential interfering channels. The apparatus is further configured to detect ACI based on the one or more dominant interfering channels.

26 Claims, 13 Drawing Sheets

(56) References Cited

U.S. PATENT DOCUMENTS

| | | | |
|---|---|---|---|
| 7,869,529 B2 | 1/2011 | Rajagopal et al. | |
| 8,149,896 B2 | 4/2012 | Filipovic | |
| 8,233,554 B2* | 7/2012 | Karabinis | H04L 5/0007 375/260 |
| 8,422,971 B2 | 4/2013 | Su et al. | |
| 8,451,918 B1* | 5/2013 | Cheng | H04K 3/228 370/208 |
| 8,693,598 B2 | 4/2014 | Subburaj et al. | |
| 2004/0142696 A1* | 7/2004 | Saunders | H04B 1/715 455/450 |
| 2007/0254590 A1* | 11/2007 | Lopez | H04B 1/1036 455/63.1 |
| 2008/0101212 A1 | 5/2008 | Yu et al. | |
| 2008/0123761 A1* | 5/2008 | Choi | H04L 27/2647 375/260 |
| 2008/0292032 A1 | 11/2008 | Belogolovy et al. | |
| 2009/0197556 A1* | 8/2009 | Iwakuni | H04B 1/1027 455/226.3 |
| 2010/0008217 A1* | 1/2010 | Ding | H04J 11/0023 370/210 |
| 2011/0182338 A1* | 7/2011 | Li | H04B 1/109 375/224 |
| 2013/0034127 A1* | 2/2013 | Subburaj | H04B 1/7073 375/148 |
| 2016/0112976 A1* | 4/2016 | Rafique | H04B 1/1036 370/330 |

* cited by examiner

| S.No | INPUTS | | | | ACI DETECTED | | | |
|---|---|---|---|---|---|---|---|---|
| # | $A_{-400}$ | $A_{-200}$ | $A_{200}$ | $A_{400}$ | 0 | 1 | 2 | 3 |
| 0 | 0 | 0 | 0 | 0 | 0 | 1 | 0 | 0 |
| 1 | 0 | 0 | 0 | 1 | 1 | 0 | 0 | 0 |
| 2 | 0 | 0 | 1 | 0 | 1 | 0 | 0 | 0 |
| 3 | 0 | 0 | 1 | 1 | 0 | 1 | 0 | 0 |
| 4 | 0 | 1 | 0 | 0 | 0 | 1 | 0 | 0 |
| 5 | 0 | 1 | 0 | 1 | 0 | 0 | 1 | 0 |
| 6 | 0 | 1 | 1 | 0 | 0 | 0 | 1 | 0 |
| 7 | 0 | 1 | 1 | 1 | 0 | 0 | 0 | 1 |
| 8 | 1 | 0 | 0 | 0 | 1 | 0 | 0 | 0 |
| 9 | 1 | 0 | 0 | 1 | 0 | 1 | 0 | 0 |
| 10 | 1 | 0 | 1 | 0 | 0 | 0 | 0 | 0 |
| 11 | 1 | 0 | 1 | 1 | 0 | 0 | 1 | 0 |
| 12 | 1 | 1 | 0 | 0 | 0 | 1 | 1 | 0 |
| 13 | 1 | 1 | 0 | 1 | 0 | 0 | 0 | 0 |
| 14 | 1 | 1 | 1 | 0 | 0 | 0 | 0 | 1 |
| 15 | 1 | 1 | 1 | 1 | 0 | 0 | 0 | 1 |

Unique +200 kHz ACI
Unique -200 kHz ACI

*FIG. 7*

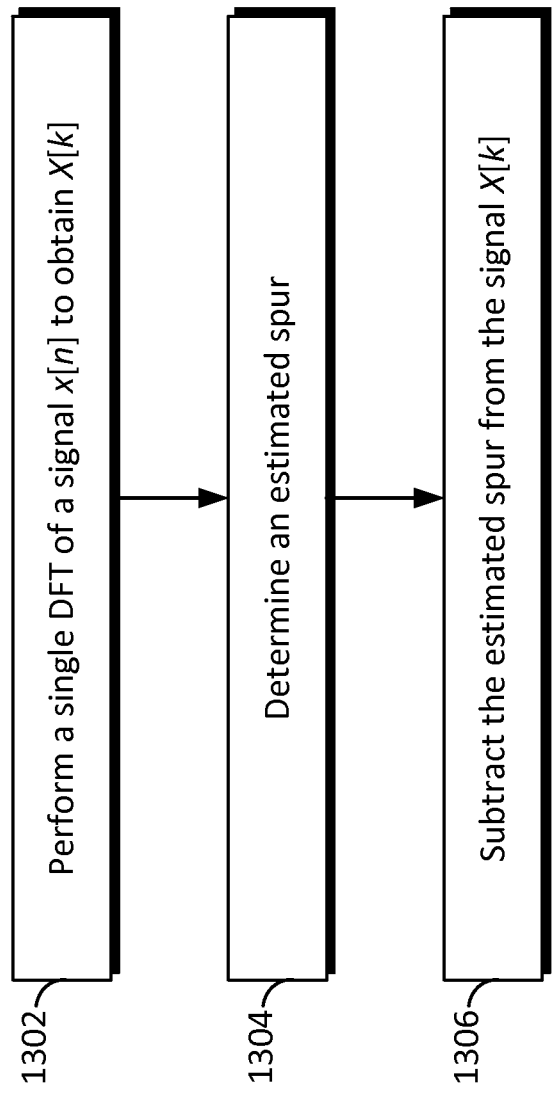

ADJACENT-CHANNEL INTERFERENCE AND SPUR HANDLING IN WIRELESS COMMUNICATIONS

CROSS-REFERENCE TO RELATED APPLICATIONS

This application claims priority to and the benefit of provisional patent application Nos. 62/064,123 and 62/064,113 both filed in the United States Patent and Trademark Office on 15 Oct. 2014, the entire contents of these applications are incorporated herein by reference.

TECHNICAL FIELD

The technology discussed below relates generally to wireless communication systems, and more particularly, to detection and handling of adjacent-channel interference (ACI) and spurs in wireless communications.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

In some networks, multiple users can share the same carrier for wireless communications simultaneously. For example, in a GSM network, a carrier is specified by an Absolute Radio Frequency Channel Number (ARFCN), which may be 200 kHz wide. The 3rd Generation Partnership Project (3GPP) Technical Specification (TS) 45.005, Radio Transmission and Reception, Release 12, describes ARFCN in detail, which is incorporated into this specification by reference. Adjacent-channel interference (ACI) can occur when two users are assigned adjacent channels (e.g., adjacent ARFCNs) and are receiving and/or transmitting at the same time utilizing the adjacent channels. For example, in a GSM transmission (radio transmission), the actual time domain symbol is such that most of its energy lie within plus or minus (+/−) 100 kHz of the carrier; however, the symbol can have an overall presence up to +/−400 kHz or even further. Although a mobile station (e.g., a cellular phone, a user equipment, wireless terminal, etc.) is designed not to violate a predefined spectral mask, actual interference levels in practice can still be undesirably high due to higher imbalance between the ARFCNs and fading under mobility conditions.

Spurs (or spurious signals) are a form of radio frequency interference that may take the form of narrow-band frequency signals. Spurs can interfere with the desired signal, directly or indirectly. In general, spurs are signals close to the carrier frequency and may interfere with the carrier. At a mobile station, spurs emanate mainly, but not limited to, from the local oscillator used for clocking and tuning purposes.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method of detecting adjacent-channel interference (ACI) to a signal operable at an apparatus. The apparatus receives a signal and performs a single discrete Fourier transform (DFT) on the signal to generate frequency domain data. The apparatus determines respective energy of a plurality of adjacent channels of the signal utilizing the frequency domain data, and determines one or more potential interfering channels among the adjacent channels. Each of the potential interfering channels has an energy greater than a qualifying threshold. The apparatus identifies one or more dominant interfering channels from among the potential interfering channels, and detects ACI based on the one or more dominant interfering channels.

Another aspect of the disclosure provides a wireless communication apparatus including a communication interface configured to receive a signal, a computer-readable medium including an adjacent-channel interference (ACI) handling code, and at least one processor coupled to the communication interface and the computer-readable medium. The apparatus is configured to perform a single discrete Fourier transform (DFT) on the signal to generate frequency domain data, and determine respective energy of a plurality of adjacent channels of the signal utilizing the frequency domain data. The apparatus is further configured to determine one or more potential interfering channels among the adjacent channels, wherein each of the potential interfering channels has an energy greater than a qualifying threshold. The apparatus is further configured to identify one or more dominant interfering channels from among the potential interfering channels, and detect ACI based on the one or more dominant interfering channels.

Another aspect of the disclosure provides a wireless communication apparatus configured to detect adjacent-channel interference (ACI) to a signal. The apparatus includes means for receiving a signal and means for performing a single discrete Fourier transform (DFT) on the signal to generate frequency domain data. The apparatus further includes means for determining respective energy of a plurality of adjacent channels of the signal utilizing the frequency domain data, and means for determining one or more potential interfering channels among the adjacent channels. Each of the potential interfering channels has an energy greater than a qualifying threshold. The apparatus further includes means for identifying one or more dominant interfering channels from among the potential interfering channels, and means for detecting adjacent-channel interference (ACI) based on the one or more dominant interfering channels.

Another aspect of the disclosure provides a computer-readable medium including an adjacent-channel interference (ACI) handling code. The ACI handling code causes a wireless communication apparatus to receive a signal and perform a single discrete Fourier transform (DFT) on the signal to generate frequency domain data. The ACI handling code further causes the apparatus to determine respective energy of a plurality of adjacent channels of the signal utilizing the frequency domain data, and determine one or more potential interfering channels among the adjacent channels. Each of the potential interfering channels has an energy greater than a qualifying threshold. The ACI handling code further causes the apparatus to identify one or more dominant interfering channels from among the potential interfering channels, and detect adjacent-channel interference (ACI) based on the one or more dominant interfering channels.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 7 is a table illustrating an example of redefined ACI bitmap values and corresponding detected ACI channels in accordance with some aspects of the disclosure.

FIG. 13 is a flow chart illustrating a spur removal method in accordance with an aspect of the disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Aspects of the present disclosure provide various discrete Fourier transform (DFT) based techniques to detect and handle spurs and adjacent-channel interference (ACI). These techniques are less susceptible to leakages from neighboring channels and can uniquely identify ACI caused by different adjacent channels. Some aspects of the disclosure provide a method for detecting and suppressing spurs to improve ACI detection. In the following illustrative examples, the techniques are illustrated using GSM channels and frequencies. However, the particular signal frequencies, channels, and sampling rates used in the described examples below are illustrative in nature and non-limiting.

Figure 1:
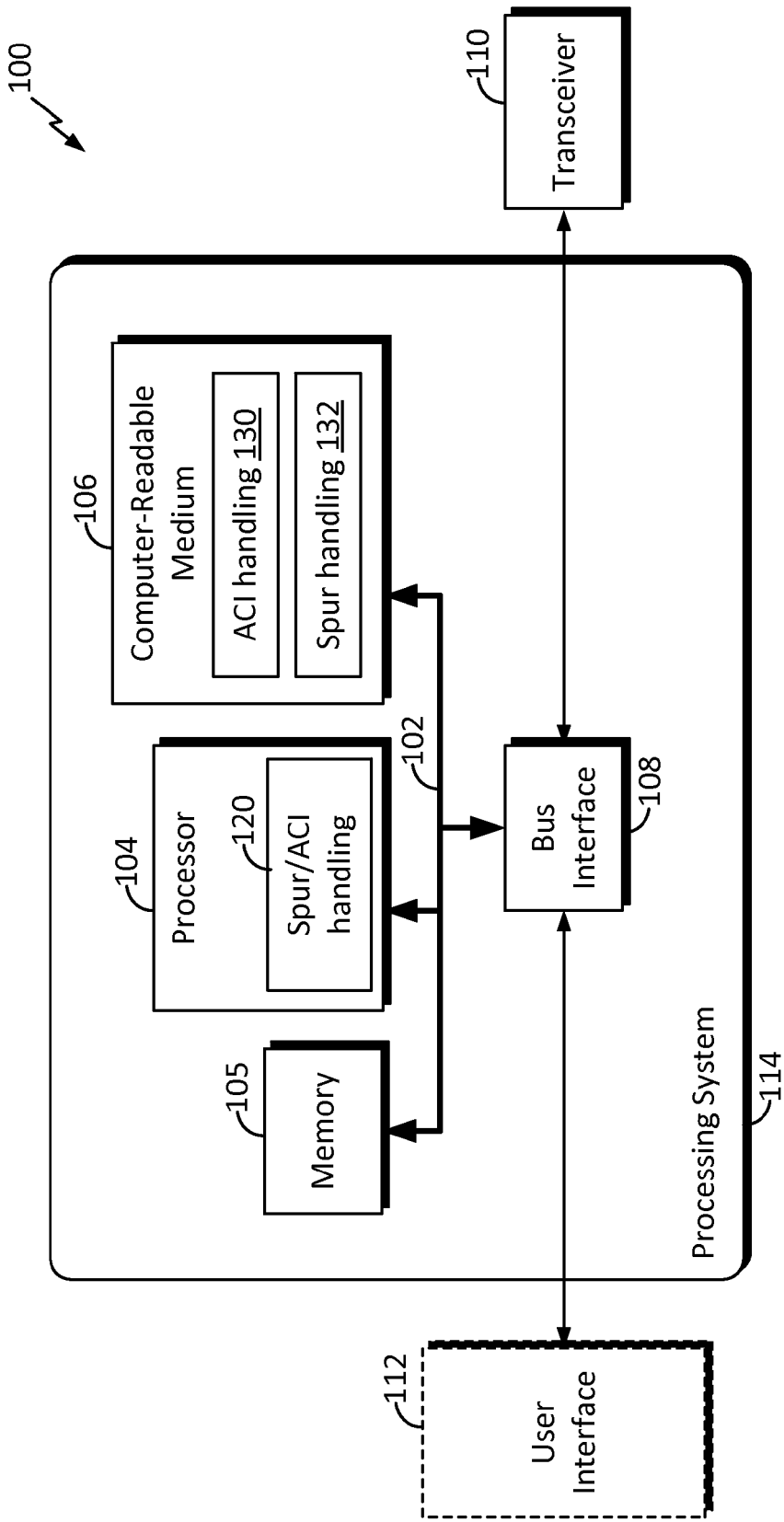
FIG. 1 is a block diagram illustrating an example of a hardware implementation for an apparatus employing a processing system operable to perform various spurs and adjacent-channel interference (ACI) functions according to some aspects of the disclosure.

FIG. 1 is a conceptual diagram illustrating an example of a hardware implementation for an apparatus 100 employing a processing system 114 operable to perform various spurs and adjacent-channel interference (ACI) functions. In accordance with various aspects of the disclosure, an element, or any portion of an element, or any combination of elements may be implemented with a processing system 114 that includes one or more processors 104 or processing circuitry. In some examples, the apparatus 100 may be a wireless communication apparatus, a mobile station, or a user equipment (UE). In other examples, the apparatus 100 may be a radio network controller (RNC) or a base station. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. For example, the processor 104, as utilized in an apparatus 100, may be used to implement any one or more of the processes and functions described below and illustrated in FIGS. 2-13.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105 (a data storage device), and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 (a communication interface) provides a means for communicating with various other apparatus over a transmission medium. The transceiver 110 or the communication interface may include, for example, a receive chain for receiving radio frequency (RF) signals, a transmit chain for transmitting RF signals, and other circuitry for processing RF signals such as mixers, converters (e.g., analog-to-digital converter and digital-to-analog converter), and amplifiers. Depending upon the nature of the apparatus, a user interface 112 (e.g., keypad, display, speaker, microphone, joystick, touchscreen, touchpad, gesture sensor) may also be provided.

Figure 2:
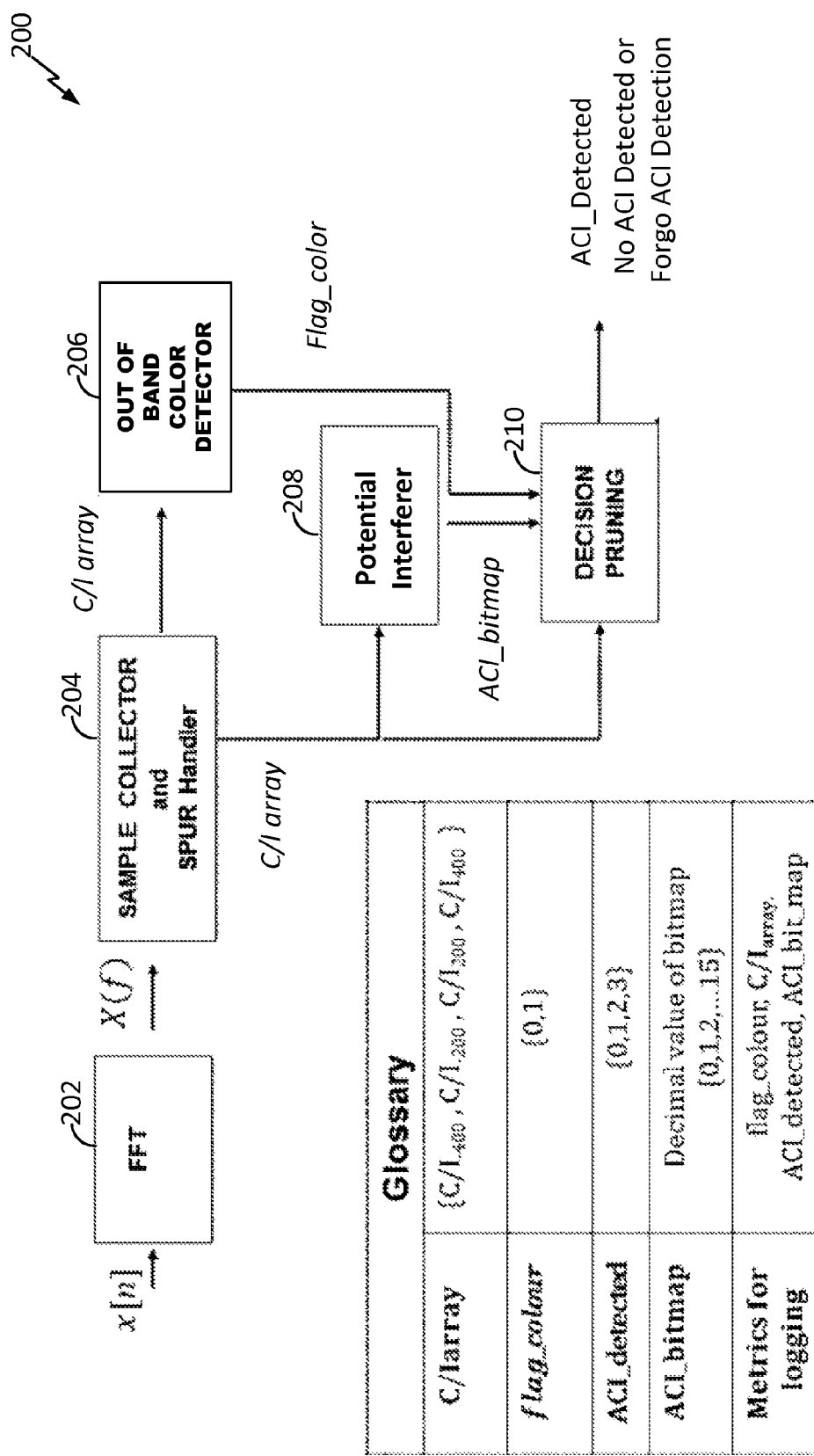
FIG. 2 is a block diagram illustrating a spur and ACI handling block of FIG. 1 in accordance with some aspects of the disclosure.

In various aspects of the disclosure, the processor 104 may include a spur and ACI handling (SAH) block 120 that can be configured to perform various DFT based techniques to detect and handle spurs and ACI. Referring to FIG. 2, the SAH block 120 includes various components such as a fast Fourier transform (FFT) block 202, a sample collector and spur handler (SCSH) block 204, an out of band color detector (OBCD) block 206, an ACI bitmap generator (ABG) block 208, and a decision pruning block 210. The ABG block 208 may also be referred to as a potential interferer determining block throughout this specification and claims. The SAH block 120 and its various components will be described in more detail in reference to FIG. 2 below.

The computer-readable medium may include an ACI handling code 130 and a spur handling code 132 when executed by the processor 104, may configure the SAH block 120 of the processor 104 or a suitable device to perform various functions, for example, to detect and handle ACI and spurs using DFT based techniques. In some aspects of the disclosure, the SAH block 120 may be utilized to perform the functions and procedures described below in relation to FIGS. 3-13. The various blocks and components of the apparatus 100 may be implemented in software, firmware, hardware, or a combination thereof.

The processor 104 is also responsible for managing the bus 102 and general processing, including the execution of software stored on the computer-readable medium 106. The software, when executed by the processor 104, causes the processing system 114 to perform the various functions described below for any particular apparatus. The computer-readable medium 106 may also be used for storing data that is manipulated by the processor 104 when executing software.

One or more processors 104 in the processing system may execute various software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

FIG. 2 is a block diagram illustrating a spur and ACI handling (SAH) block 200 in accordance with some aspects of the disclosure. The SAH block 200 may be the same as the SAH block 120 of FIG. 1. In one aspect of the disclosure, the apparatus 100 may be a GSM mobile station. The energy of the adjacent channels of a GSM channel may be calculated by utilizing an N point FFT on a signal sampled at Fs=270.8333*4 kHz (i.e., 270.8333 times 4 kHz). Therefore, in this example, the visible energy spectrum is between −541.67 kHz and +541.67 kHz, covering five ARFCNs. In this particular example, the value 270.8333 is chosen for a GSM example, but other values may be used for other wireless communication standards.

The FFT block 202 receives input samples x[n] of a signal and returns an N-point FFT X(f) of the input samples x[n] that are sampled at four times the channel's frequency, where N=1024.

$$X(k) = \sum_{n=0}^{N-1} x[n] * e^{-j2\pi nk/N} k{:}1,2,\ldots N \qquad \text{Equation (0)}$$

Figure 3:
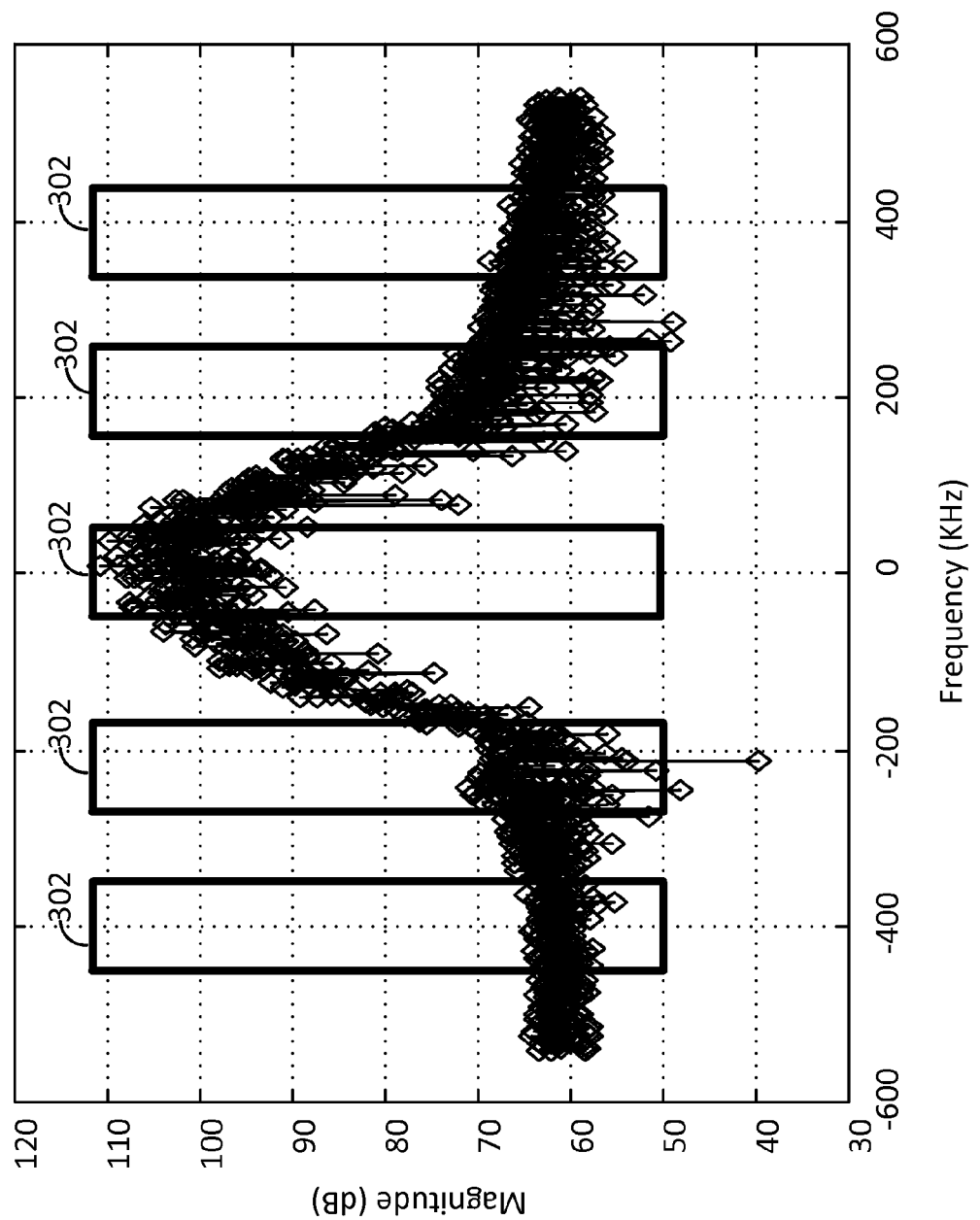
FIG. 3 is a graph illustrating an example of the magnitude response of the input samples of a signal in the frequency domain in accordance with some aspects of the disclosure.

FIG. 3 is a graph illustrating an example of the magnitude response of the input samples of a signal. The SCSH block 204 receives the N-Point FFT X(f) and detects the presence of spurs from X(f). If spurs are detected, the SCSH block 204 may optionally suppress the spurs. Spur detection will be described in more detail below. In addition, the SCSH block 204 computes the energies around the center frequencies of the adjacent channels (e.g., +/−200 kHz and +/−400 kHz in FIG. 3) and returns four carrier-to-interference (C/I) values ($C/I_{-400}$, $C/I_{-200}$, $C/I_{+200}$, $C/I_{+400}$), which form a C/I array. The C/I value is a ratio between the average received carrier power C and the average received interference power I of the channels. In one example, the energies are computed across the bins 302 (e.g., 94 samples per bin) centered at the mobile device's assigned ARFCN (i.e., carrier) and adjacent ARFCNs (see FIG. 3). In FIG. 3, the center frequencies of the ARFCNs are located at −400 kHz, −200 kHz, 0 kHz, +200 kHz, and +400 kHz (0 kHz being the device's assigned ARFCN). Therefore, for this particular example, the corresponding center values for k of Equation 0 are 645, 834, 189, and 378. In this example, the bandwidth is equal to about 100 kHz (i.e., 94 times 4 times 270.833/1024).

The OBCD block 206 determines if there are dominant interferer(s) (interfering adjacent channel) or noise based on the C/I array received from the SCSH block 204. The OBCD block 206 indicates the absence of a dominate interferer (e.g., flag as no color) if all four adjacent ARFCNs (e.g., −400 kHz, −200 kHz, +200 kHz, +400 kHz) are substantially equal in strength, or there is noise domination across the neighboring ARFCNs. In one example, the flag (flag_color) may be set to 1 when a dominant interferer is present, or set to 0 when a dominant interferer is not present. For example, the dominant interferer is substantially the same in strength across the ARFCNs. Detecting the presence of a dominant interferer can avoid unnecessarily invoking the ACI detection procedure and creating false alarms.

Figure 4:
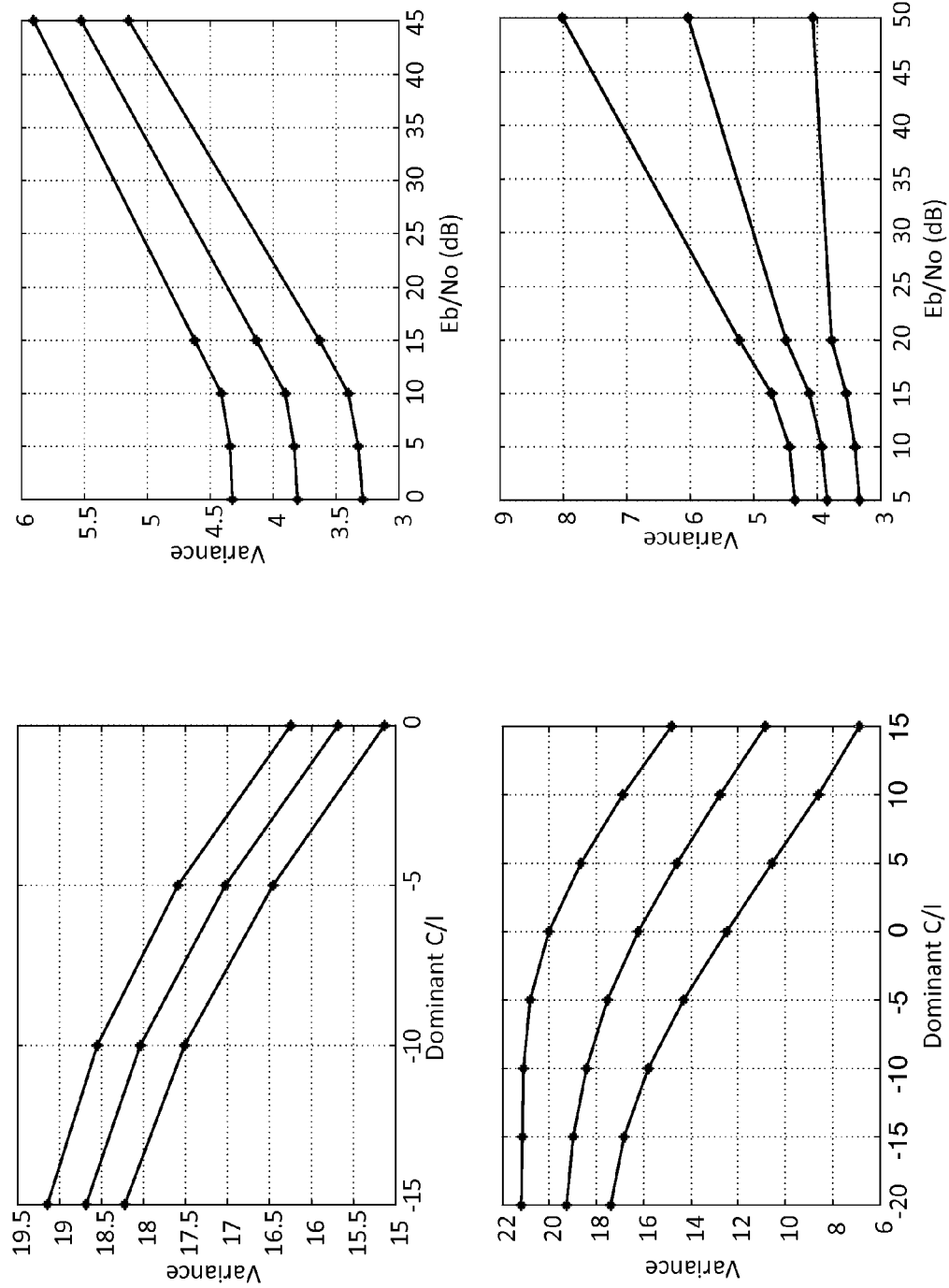
FIG. 4 includes graphs illustrating the variances of a C/I array in a scenario with a dominant interferer and another scenario without a dominant interferer in accordance with some aspects of the disclosure.

In one aspect of the disclosure, the OBCD block 206 may determine whether a dominant interferer exists or not by utilizing the standard deviation of the C/I array. In general, a lower variance indicates more white interference or noise, and a higher variance indicates the presence of a dominant interferer. Therefore, a suitable threshold (e.g., a predetermined threshold) can be used to separate the two scenarios (i.e., dominant interferer presence or no dominant interferer). FIG. 4 includes graphs illustrating the variances of the C/I array in a scenario with a dominant interferer and another scenario without a dominant interferer. In FIG. 4, the two left graphs illustrate the variance of the C/I array when a dominant interferer is present. The bottom left graph illustrates the effect of signal fading on the variance. The two right graphs illustrate the variance of the C/I array when no dominate interferer is present. The bottom right graph illustrates the effect of signal fading on the variance. In the left figures of FIG. 4, the x-axes represent the signal to interference ratio. In the right figures of FIG. 4, the x-axes represent the signal to noise ratio. In this particular example, a suitable qualifying threshold between 5 and 8 (variance) may be used to differentiate the two scenarios. That is, if the variance is less than the threshold, it indicates that no dominant interferer is present among the adjacent channels. On the other hand, if the variance is greater than the threshold, it indicates that a dominant interferer is present among the adjacent channels. The output (e.g., dominant interferer presence or no dominant interferer) of the OBCD block 206 may be used by the decision pruning block 210 to determine whether to perform ACI detection or forgo ACI detection.

The ABG block 208 (a potential interferer determining block) provides the first snapshot of the spectrum and interference candidates for analysis. It generates an ACI bitmap of the qualifying interferers (i.e., potential interfering ARFCNs or channels). In one example, the ACI bitmap is a 4-bit binary mapping of the C/I array. Each bit represents one of the adjacent channels (e.g., −400 kHz, −200 kHz, +200 kHz, and +400 kHz adjacent channels). If an adjacent channel causes an interference greater a certain threshold (e.g., C/I greater than a predetermined threshold), its corresponding bit in the ACI bitmap is set to 1; otherwise, the bit is set to 0. In other examples, the bit values may be reversed (i.e., 0 for above the threshold and 1 for below threshold). Therefore, the chosen interference threshold can affect the ACI detection percentage. For example, a higher threshold leads to lower ACI detection rate and vice versa. In one aspect of the disclosure, the threshold may have a value between 10 dB and 20 dB. This ACI bitmap together with the C/I array and flag_color are fed into the decision pruning block 210.

The decision pruning block 210 is used to scrutinize or improve the initial decision made by the ABG block 208. The decision pruning block 210 can redefine the ACI bitmap such that the decision is dominated by stronger interferers. In one example, if one interferer of a double sided ACI (e.g., +/−200 kHz) is significantly stronger than the other, the weaker one may be rejected (not considered for ACI detection), and the double sided ACI can be treated as a single sided ACI. In one aspect of the disclosure, the decision pruning block 210 can identify one or more dominant interferers and one of the following ACI detection scenarios: none, positive (e.g., +200 kHz, +400 KHz), negative (e.g., −200 kHz, −400 kHz), double sided (e.g., +/−200 kHz, +/−400 kHz). After pruning (i.e., redefining or adjusting the ACI bitmap), a final ACI bitmap is used to determine whether any unique +/−200 kHz ACI is detected. For example, an ACI is "unique" when it is the sole interferer. A suitable filter then may be used to reject the interferer. In one example, the filter may be a shifted digital filter.

In one aspect of the disclosure, if the flag_color received from the OBCD block 206 indicates that there is no dominant interferer, the decision pruning block 201 may determine that there is no ACI or forgo ACI detection (e.g., do not perform ACI detection). Therefore, based on the ACI bitmap and flag_color flag, and the decision pruning block 210 may indicate ACI detected, no ACI detected, or forgo ACI detection.

Figure 5:
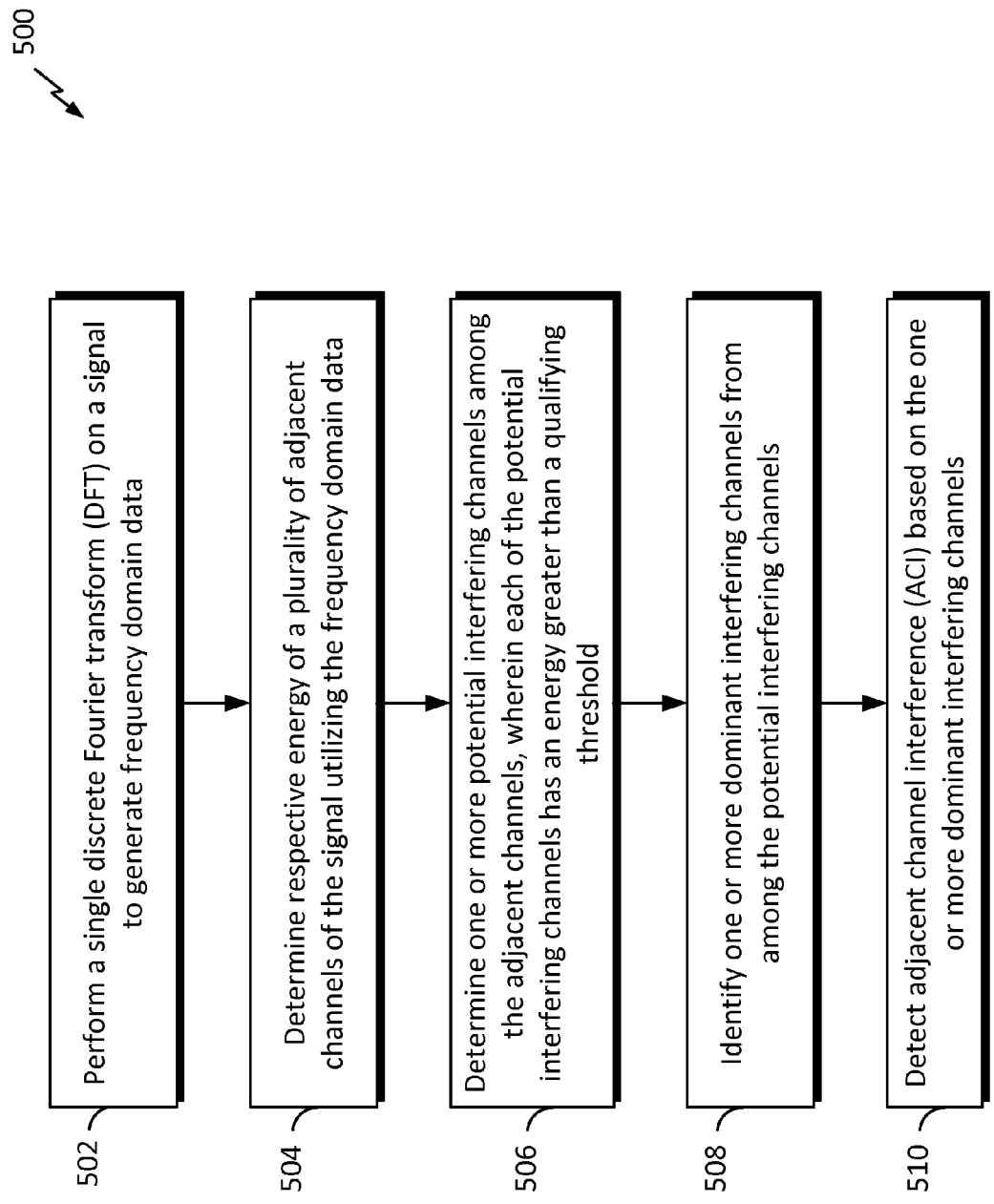
FIG. 5 is a flow chart illustrating an ACI detection method in accordance with some aspects of the disclosure.

FIG. 5 is a flow chart illustrating an adjacent-channel interference (ACI) detection method 500 in accordance with some aspects of the disclosure. The ACI detection method 500 may be performed by the apparatus 100 or any suitable device. In one aspect of the disclosure, the ACI detection method 500 may be implemented as the ACI handling code 130, which when executed by the processor 104, can configure the SAH block 120 of the processor 104 to perform various functions to detect and handle ACI using DFT based techniques illustrated in FIGS. 3-13. At block 502, the FFT block 202 may be utilized to perform a discrete Fourier transform (DFT) on a signal (e.g., x[n]) to generate frequency domain data. In one aspect of the disclosure, a single (i.e., one) DFT operation is performed on the signal to generate the frequency domain data. At block 504, the SCSH block 204 may be utilized to determine the respective energy of a plurality of adjacent channels of the signal utilizing the frequency domain data. For example, the respective energy may be represented as a C/I array as described in FIG. 2 above.

At block 506, the ABG block 208 may be utilized to determine one or more potential interfering channels among the adjacent channels. Each of the potential interfering channels has an energy greater than a qualifying threshold. For example, a potential interfering channel may be any one of the +/−200 kHz and +/−400 kHz interferers. In one aspect of the disclosure, the qualifying threshold may have a value between 10 dB and 20 dB. At block 508, a decision pruning block 210 may be utilized to identify one or more dominant interfering channels from among the potential interfering channels. The identified one or more dominant interfering channels may be indicated by a redefined ACI bitmap. For example, there may be no dominant interfering channels, positive dominant interfering channel(s) (e.g., +200 kHz, +400 kHz), and/or negative dominant interfering channel(s) (e.g., −200 kHz, −400 kHz). At block 510, the decision pruning block 212 may be utilized to detect ACI based on the one or more dominant interfering channels (e.g., indicated by a redefined ACI bitmap).

Figure 6:
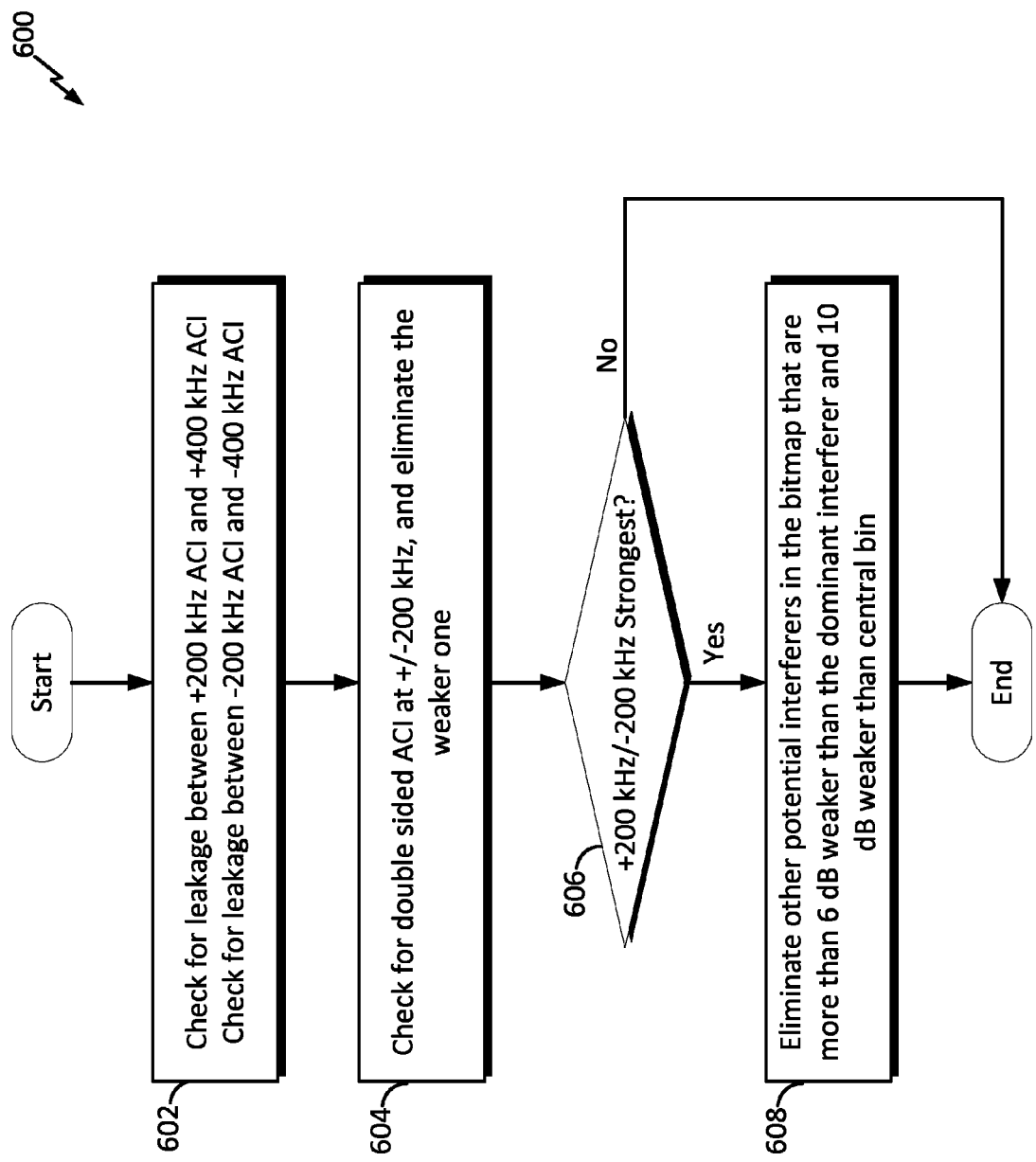
FIG. 6 is a flow chart illustrating a pruning procedure for eliminating potential interferers from ACI detection in accordance with some aspects of the disclosure.

FIG. 6 is a flow chart illustrating a pruning procedure 600 that may be performed at a decision pruning block 210 to eliminate potential interferers from ACI detection in accordance with some aspects of the disclosure. In one example, the pruning procedure 600 may be implemented as a part of the ACI handling code 130 and performed at the block 508 of the method 500. At block 602, the decision pruning block 210 checks for leakages (spectral leakages) between adjacent potential interferers, for example, between −200 kHz and −400 kHz interferers, and between +200 kHz and +400 kHz interferers, using a suitable threshold (prun_th). In one example, the value of the threshold prun_th may be 25 dB. If the difference in energy between two adjacent interferers (e.g., −200 kHz/−400 kHz or +200 kHz/+400 kHz) is greater than the threshold prun_th, the weaker interferer is considered a leakage from the stronger one. Therefore, the weaker interferer's bit in the ACI bitmap may be set to 0 (i.e., not considered to be a potential interferer for ACI detection).

At block 604, the decision pruning block 210 checks for double sided ACI at +/−200 kHz, and eliminates the weaker one of the potential interferers. In one example, if both +/−200 kHz adjacent channels are determined to be potential interferers, the weaker channel can be eliminated if it is more than 6 dB weaker than the stronger channel, and more than 5 dB weaker than the central bin (e.g., carrier channel; the center bin 302 of FIG. 3). At decision block 606, if it is determined that the −200 kHz or +200 kHz channel is the strongest interferer, the procedure 600 proceeds to block 608. At block 608, the decision pruning block 210 may eliminate all other potential interferers in the ACI bitmap (e.g., setting the bits to 0) other than the strongest interferer. In one example, the decision pruning block 210 may eliminate other potential interferers in the ACI bitmap that are more than 6 dB weaker than the dominant interferer (e.g., −200 kHz interferer or +200 kHz interferer) and 10 dB weaker than the central bin. The pruning procedure 600 is not limited to the exemplary frequencies used for illustration. In other aspects of the disclosure, the pruning procedure 600 may be used to handle adjacent interferers at other frequencies.

FIG. 7 is a table 700 illustrating an example of redefined ACI bitmap values and corresponding detected ACI channel in accordance with an aspect of the disclosure. In one example, the redefined ACI bitmap values are generated by the decision pruning block 210. Each row of the table 700 corresponds to one of the sixteen possible bitmap values (for 4-bit bitmap). For example, row 0 corresponds to the bitmap value 0000 (input columns), and row 15 corresponds to the bitmap value 1111. In this example, any bit of the bitmap set to 1 indicates that the corresponding channel frequency is a potential interferer. Therefore, a bit set to 1 in the $A_{-400}$ column indicates that the −400 kHz channel is a potential interferer. Similarly, a bit set to 1 in any of the columns $A_{-200}$, $A_{+200}$, and $A_{+400}$ indicates a potential interferer. In one aspect of the disclosure, ACI detection is made based on the middle two columns (i.e., $A_{-200}$ and $A_{+200}$). The four possible outcomes are illustrated in Table 1 below.

TABLE 1

| Case | $A_{-200}$ | $A_{+200}$ |
|---|---|---|
| 0 | 0 | 0 |
| 1 | 0 | 1 |
| 2 | 1 | 0 |
| 3 | 1 | 1 |

In case 0, no ACI is detected from +/−200 kHz. In case 1, ACI is detected from +200 kHz. In case 2, ACI is detected from −200 kHz. In case 3, ACI is detected from both +/−200 kHz (double sided ACI). In one aspect of the disclosure, the decision pruning block 210 indicates ACI detected only if unique ACI is detected from +200 kHz or −200 kHz. For example, rows 2 and 4 of table 700 indicate unique ACI from −200 kHz or −200 kHz. In row 2, the bitmap indicates only the +200 kHz as the potential interferer. In row 4, the bitmap indicates only the −200 kHz as the potential interferer. In these examples, the −200 kHz or +200 kHz interferer is unique because it is the sole interferer.

Spurs Handling

Referring back to FIG. 2, in some aspects of the disclosure, the SCSH block 204 also detects and handles spurs or spurious signals. When the apparatus 100 performs the above-described ACI related functions, the presence of spurs can cause false alarms and invoke ACI algorithms that are not appropriate for that scenario, which can degrade ACI related performance. Furthermore, spurs can affect channel acquisition. For example, spurs may get detected as the tones from a Frequency Correction Channel (FCCH) of a GSM network, which is used by a mobile station to lock or synchronize its local oscillator to the base station clock. False detection of FCCH tones can delay the acquisition process due to unnecessary Synchronization Channel (SCH) scheduling.

Figure 8:
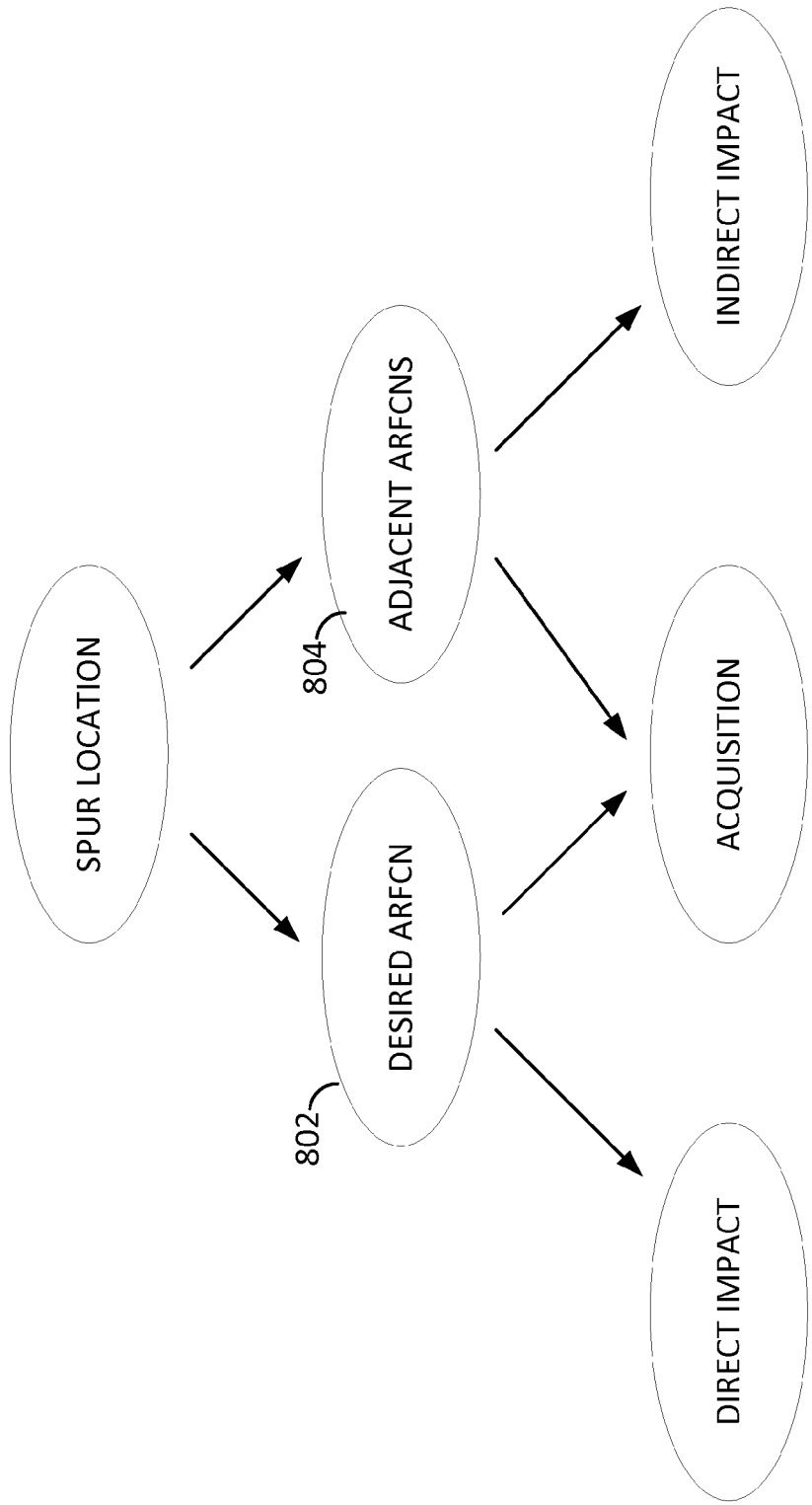
FIG. 8 is a drawing illustrating an example of spur classification and impact areas in accordance with some aspects of the disclosure.

FIG. 8 is a drawing illustrating an example of spur classification and impact areas in accordance with aspects of the disclosure. If a spur or spurious signal is located at or near a carrier 802 (desired ARFCN) assigned to a mobile station, the spur may directly impact such carrier and its acquisition by the mobile station. If a spur is located at or near the adjacent ARFCNs 804, the spur may still indirectly impact the desired ARFCN and its acquisition.

Figure 9:
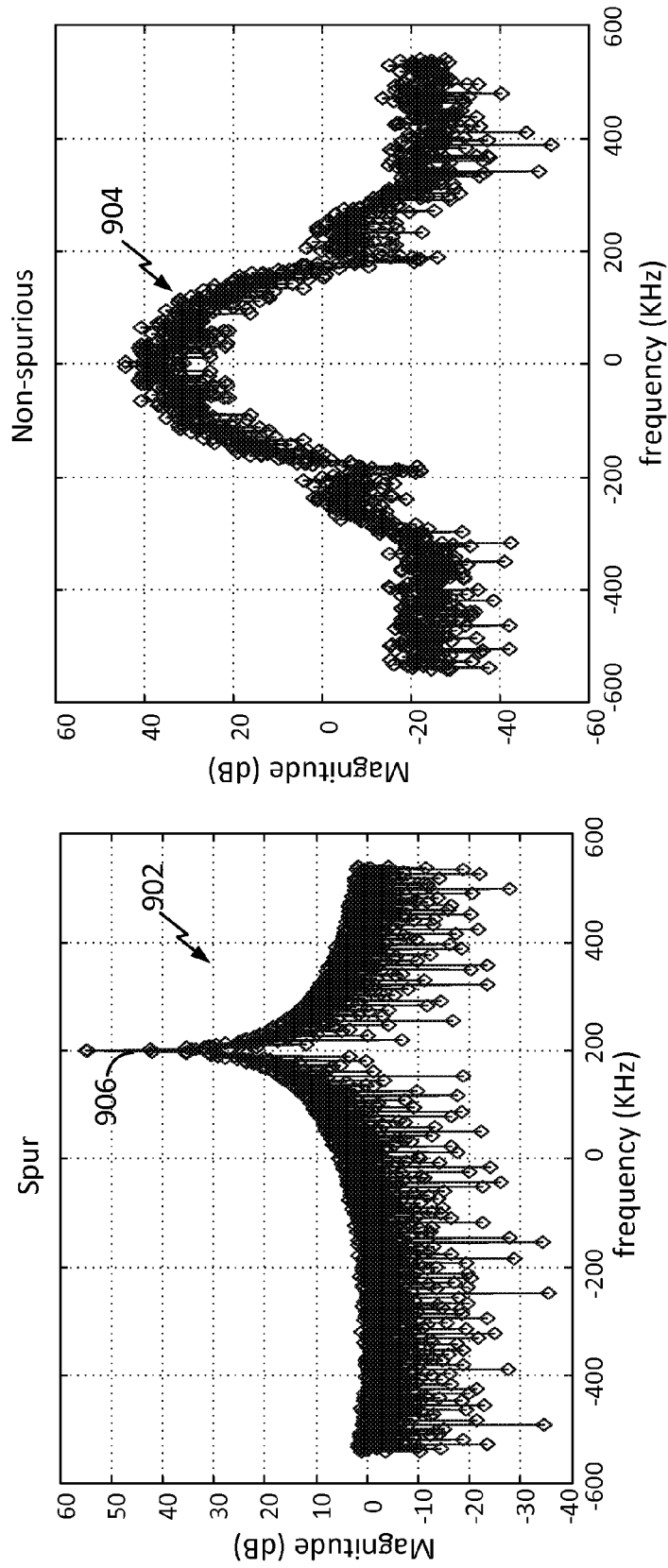
FIG. 9 includes two graphs illustrating the magnitude responses of a spur and a non-spurious signal in accordance with an aspect of the disclosure.
Figure 10:
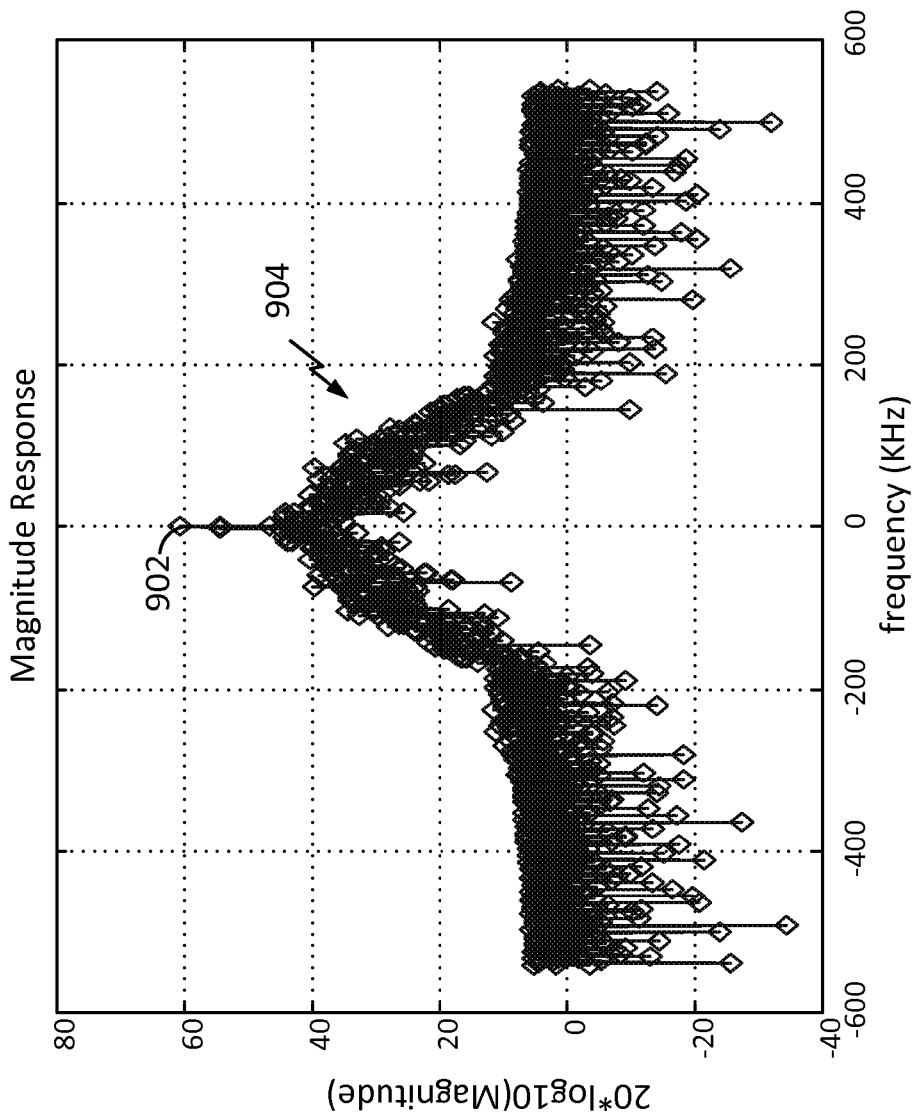
FIG. 10 is a graph illustrating the spur standing out from the non-spurious signal of FIG. 9.

Some aspects of the disclosure provide a method for differentiating and suppressing spurs from other high bandwidth signals (e.g., GSM carriers or other wireless communication channels). Spurs are monotonic in nature and have their energies concentrated around their frequency. FIG. 9 includes two graphs illustrating the magnitude responses of a spur 902 and a non-spurious signal 904 in accordance with an aspect of the disclosure. The energy gradient of the spur 902 against frequency is quite steep relative to that of the non-spurious signal. When compared to the non-spurious signal 904 (e.g., a GSM carrier), it can be seen that the spur 902 has a substantially more prominent peak 906, which can be considered an outlier among the data set. FIG. 10 is another graph illustrating the spur 902 standing out from the non-spurious signal 904 when both signals are shown in the same graph.

In one aspect of the disclosure, the spur 902 or a spurious signal can be detected by utilizing a peak to average ratio (PAR) computed in the frequency domain as defined by equation 1 below.

Let the DFT of the signal x[n] be X[k] as shown in equation 1.

$$X[k] = \sum_{n=0}^{N-1} x[n] e^{-j2\pi \frac{k}{N} n} \quad k: 0, 1, \ldots N \tag{1}$$

In this equation, X[k] is the frequency domain data of the signal x[n]. Then, the PAR can be computed as follows:

$$PAR = \frac{\max(|X[k]|)}{\frac{1}{k2 - k1 + 1} \sum_{k=k1}^{k2} |X[k]|},$$

where N is the FFT windows size, k1 is the bin start, and k2 is the bin end. When the PAR is above or greater than a spur detection threshold, it indicates that spur is detected.

Figure 11:
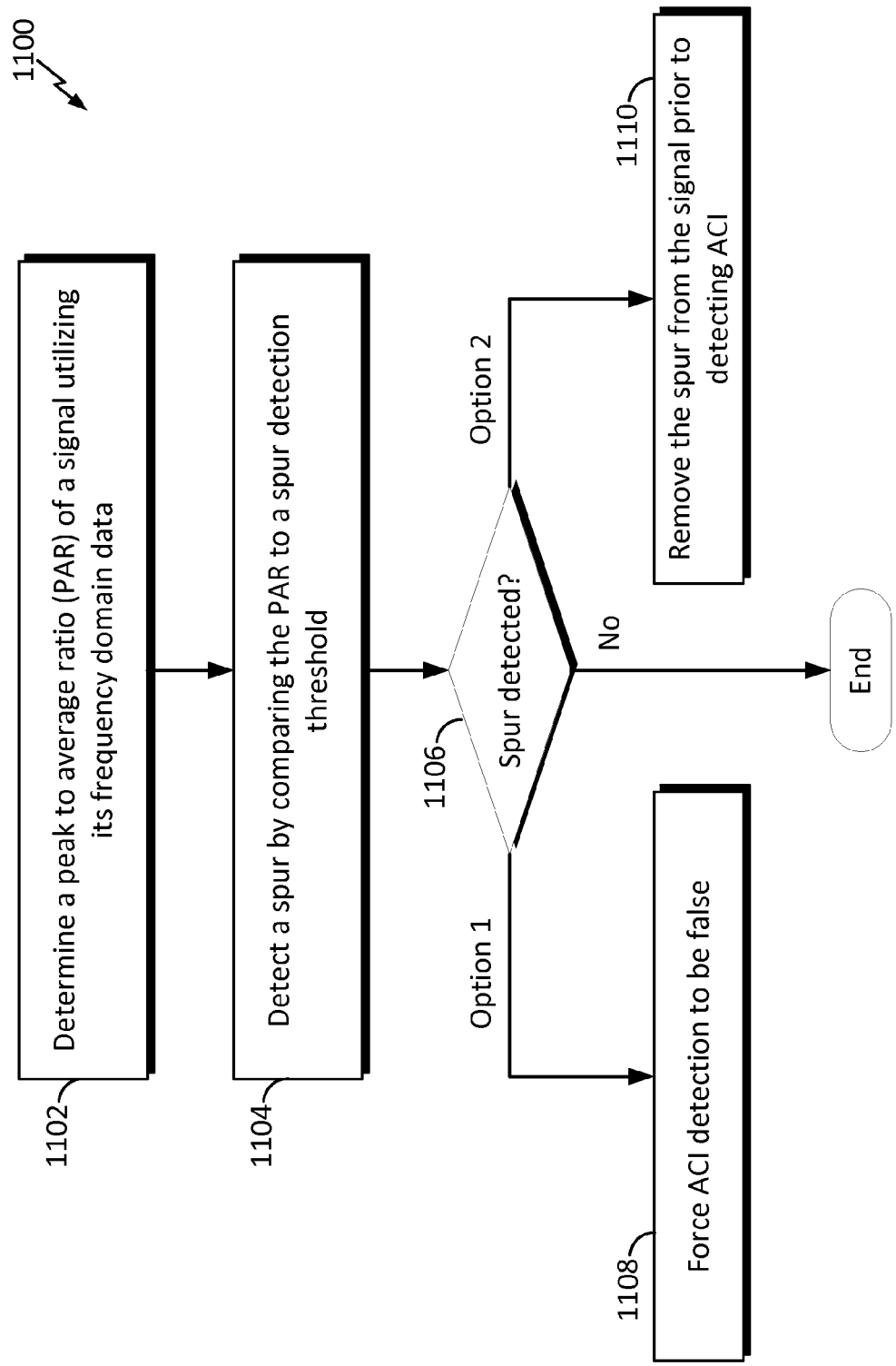
FIG. 11 is a flow chart illustrating a spur detection method in accordance with an aspect of the disclosure.

FIG. 11 is a flow chart illustrating a spur detection method 1100 in accordance with an aspect of the disclosure. The spur detection method 1100 may be performed by the apparatus 100 or any suitable device. In one aspect of the disclosure, the spur detection method 1100 may be implemented as a part of the spur handling code 132, which when executed by the processor 104 or any processing circuit, may configure the SAH block 120 (see FIGS. 1 and 2) to perform various functions to detect and handle spurs using DFT based techniques. For the example, the SCSH block 204 may be configured to detect and handle spurs according to the method 1100. At block 1102, the apparatus determines a peak to average ratio (PAR) of a signal utilizing its frequency domain data. The frequency domain data may be obtained by performing a DFT (e.g., a single DFT) on the signal samples utilizing the FFT block 202. At block 1104, the apparatus detects a spur by comparing the PAR to a spur detection threshold. In one example, the spur detection threshold may be set to 10 dB or any predetermined value.

At decision block 1106, if a spur is detected, (option 1) the apparatus may force ACI detection to be false at block 1108. For example, ACI detection may be forced to be false in block 510 of FIG. 5. Alternatively, (option 2) the apparatus may remove the spur from the signal prior to performing the ACI detection functions as described above in FIGS. 5 and 6, for example. It may be an implementation choice to utilize either option 1 or option 2 when a spur is detected. In some examples, the apparatus may support only one or both options.

Figure 12:
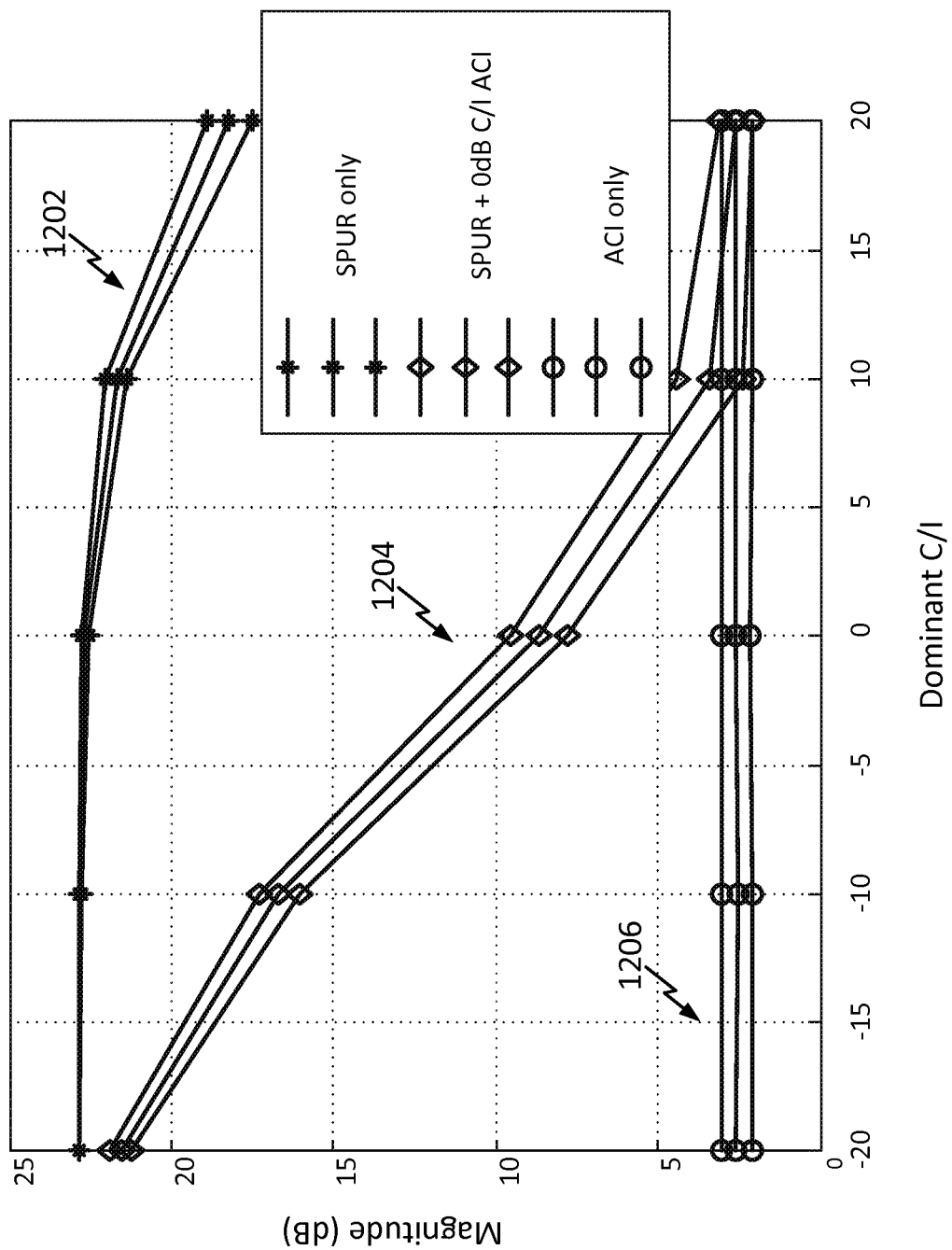
FIG. 12 is a graph illustrating the peak to average ratios (PAR) of three exemplary spur and ACI scenarios in accordance with some aspects of the disclosure.

FIG. 12 is a graph illustrating the PAR of a signal in three scenarios—spur only 1202, spur and ACI 1204, and ACI only 1206. In the spur only scenario, the PAR is between above 17 dB and about 23 dB. In the spur and ACI scenario, the PAR is between 2 dB and about 23 dB. In the ACI only scenario, the PAR is below 5 dB. Therefore, in this particular example, the spur detection threshold may be set to about 10 dB or a suitable value to differentiate the spur only scenario from the ACI only scenario. Once a spur is detected in a bin, there are two options to handle it as described in FIG. 11 above. In a first option, ACI detection may be forced to be false (i.e., no ACI detected) for the bin that satisfies the PAR threshold. In a second option, if spur parameters are known (e.g., frequency, amplitude, duration, start time, and phase), the spur may be suppressed, removed, or rejected from the desired signal. In one example, a method for determining or estimating spur parameters is disclosed in a copending patent application Ser. No. 14/630,386, titled Estimation of Spur Parameters in Wireless Communications, filed on even date herewith in the United States Patent and Trademark Office, which is incorporated herein by reference.

FIG. 13 is a flow chart illustrating a spur removal method 1300 in accordance with an aspect of the disclosure. The spur removal method 1300 may be performed by the apparatus 100 or any suitable device. In one aspect of the disclosure, the spur removal method 1300 may be implemented as a part of the spur handling code 132, which when executed by the processor 104, may configure the SCSH block 204 to perform various spur related functions.

Let the signal samples be x[n], which can be represented as equation 2 below.

$$x[n]=s[n]+z[n]n{:}a,a+1,a+2\ldots a+\overline{N}-1 \qquad \text{Equation (2).}$$

Here, s[n] is the spur and z[n] is the other signal or noise.

$$s[n] = Ae^{j\left(2\pi\frac{F_{spur}}{F_s}n+\varphi\right)} \qquad (2.1)$$

In the above equations 2 and 2.1, a is the start of the spur, $\overline{N}$ is the duration, $F_{spur}$ is the spur frequency, $F_s$ is the sampling frequency, N is the FFT window size, A is the amplitude, and φ is the initial phase offset.

At block 1302, a DFT (e.g., a single DFT) is performed on x[n] to get X[k], which can be represented as equation 2.2 below.

$$X[k]=S[k]+Z[k] \text{ for } k=k1 \text{ to } k2, \qquad (2.2)$$

wherein k1 is the bin start and k2 is the bin end.

At block 1304, an estimated spur is determined Let $\hat{S}[k]$ be the spur estimate, which can be represented as equation 3 below.

$$\hat{S}[k] = Ae^{j[\pi\alpha(N-1+2a)+\varphi]}\frac{\sin(\pi\alpha N)}{\sin(\pi\alpha)} \qquad (3)$$

with, $$\alpha = \frac{F_{sput}}{F_s} - \frac{k}{N}$$

At block 1306, the estimated spur $\hat{S}[k]$ can be subtracted from the signal X[k].

$$X\text{sub}[k]=X[k]-\hat{S}[k]$$

$$X\text{sub}[k]=Z[k]+(S[k]-\hat{S}[k]), \text{ for } k=k1 \text{ to } k2$$

The subtraction can be written in vector form.

$$X\text{SUB}=Z+\gamma$$

where, $\gamma=(S-\hat{S})$

It can be seen that $XSUB*XSUB^H$ reaches $ZZ^H$ as γ approaches 0. This implies that the spur's contribution to the desired bandwidth/frequency is minimized or substantially reduced. In an aspect of the disclosure, the above-described spur handling procedure may be utilized to remove the spur from the signal prior to ACI detection as described in relation to FIGS. 2 to 10 above.

As those skilled in the art will readily appreciate, various aspects described throughout this disclosure may be extended to any telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-5 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-5 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: at least one a; at least one b; at least one c; at least one a and at least one b; at least one a and at least one c; at least one b and at least one c; and at least one a, at least one b and at least one c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of detecting adjacent-channel interference (ACI) to a signal, the method comprising:
   receiving said signal;
   performing a single discrete Fourier transform (DFT) on the signal to generate frequency domain data;
   determining respective energy of a plurality of adjacent channels of the signal utilizing the frequency domain data, comprising determining carrier-to-interference (C/I) corresponding to the adjacent channels;
   determining one or more potential interfering channels among the adjacent channels, wherein each of the potential interfering channels has an energy greater than a qualifying threshold;
   identifying one or more dominant interfering channels from among the potential interfering channels; and
   detecting ACI based on the one or more dominant interfering channels.

2. The method of claim 1, further comprising:
   determining a variance of the energies of the adjacent channels; and
   if the variance is less than a threshold, forgoing ACI detection.

3. The method of claim 1, further comprising:
   determining a peak to average ratio (PAR) of the signal utilizing the frequency domain data; and
   detecting a spur by comparing the PAR to a spur detection threshold.

4. The method of claim 3, further comprising:
   if said spur is detected, forcing ACI detection to be false.

5. The method of claim 3, further comprising:
   if a spur is detected, removing the spur from the signal prior to detecting ACI.

6. The method of claim 1, wherein the identifying one or more dominant interfering channels comprises at least one of:
   if a leakage is detected between two adjacent channels of the potential interfering channels, removing a weaker one of the adjacent channels from ACI detection; or
   if a double sided ACI is detected, removing a weaker one of the potential interfering channels constituting the double sided ACI.

7. The method of claim 1, wherein the identifying one or more dominant interfering channels comprises:
   if a dominant interfering channel is identified among the potential interfering channels, removing the other potential interfering channels from ACI detection,
   wherein the dominant interfering channel has an energy greater than that of the other potential interfering channels by at least a first amount, and
   wherein the respective energies of the other potential interfering channels are lower than that of the signal by at least a second amount.

8. A wireless communication apparatus comprising:
   a communication interface configured to receive a signal;
   a fast Fourier transform (FFT) block configured to perform a single discrete Fourier transform (DFT) on the signal to generate frequency domain data;
   a sample collector and spur handler (SCSH) block configured to determine respective energy of a plurality of adjacent channels of the signal utilizing the frequency domain data, comprising determining carrier-to-interference (C/I) corresponding to the adjacent channels;
   a potential interferer determining block configured to determine one or more potential interfering channels among the adjacent channels, wherein each of the potential interfering channels has an energy greater than a qualifying threshold; and
   a decision pruning block configured to:
      identify one or more dominant interfering channels from among the potential interfering channels; and
      detect ACI based on the one or more dominant interfering channels.

9. The wireless communication apparatus of claim 8, further comprising an out of band color detector (OBCD) configured to:
   determine a variance of the energies of the adjacent channels; and
   if the variance is less than a threshold, forgo ACI detection.

10. The wireless communication apparatus of claim 8, wherein the SCSH block is further configured to:
   determine a peak to average ratio (PAR) of the signal utilizing the frequency domain data; and detect a spur by comparing the PAR to a spur detection threshold.

11. The wireless communication apparatus of claim 10, wherein the decision pruning block is further configured to:
if said spur is detected, force ACI detection to be false.

12. The wireless communication apparatus of claim 10, wherein the SCSH block is further configured to:
if the spur is detected, remove the spur from the signal prior to detecting ACI.

13. The wireless communication apparatus of claim 8, wherein the decision pruning block is further configured to at least one of:
if a leakage is detected between two adjacent channels of the potential interfering channels, remove a weaker one of the adjacent channels from ACI detection; or
if a double sided ACI is detected, remove a weaker one of the potential interfering channels constituting the double sided ACI.

14. The wireless communication apparatus of claim 8, wherein the decision pruning block is further configured to:
if a dominant interfering channel is identified among the potential interfering channels, remove the other potential interfering channels from ACI detection,
wherein the dominant interfering channel has an energy greater than that of the other potential interfering channels by at least a first amount, and
wherein the respective energies of the other potential interfering channels are lower than that of the signal by at least a second amount.

15. A wireless communication apparatus comprising:
means for receiving a signal;
means for performing a single discrete Fourier transform (DFT) on the signal to generate frequency domain data;
means for determining respective energy of a plurality of adjacent channels of the signal utilizing the frequency domain data, comprising determining carrier-to-interference (C/I) corresponding to the adjacent channels;
means for determining one or more potential interfering channels among the adjacent channels, wherein each of the potential interfering channels has an energy greater than a qualifying threshold;
means for identifying one or more dominant interfering channels from among the potential interfering channels; and
means for detecting adjacent-channel interference (ACI) based on the one or more dominant interfering channels.

16. The wireless communication apparatus of claim 15, further comprising:
means for determining a variance of the energies of the adjacent channels; and
means for if the variance is less than a threshold, forgoing ACI detection.

17. The wireless communication apparatus of claim 15, further comprising:
means for determining a peak to average ratio (PAR) of the signal utilizing the frequency domain data; and
means for detecting a spur by comparing the PAR to a spur detection threshold.

18. The wireless communication apparatus of claim 17, further comprising:
if said spur is detected, means for forcing ACI detection to be false or removing the spur from the signal prior to detecting ACI.

19. The wireless communication apparatus of claim 15, wherein the means for identifying one or more dominant interfering channels is configured to, at least one of:
if a leakage is detected between two adjacent channels of the potential interfering channels, remove a weaker one of the adjacent channels from ACI detection; or
if a double sided ACI is detected, remove a weaker one of the potential interfering channels constituting the double sided ACI.

20. The wireless communication apparatus of claim 15, wherein the means for identifying one or more dominant interfering channels is configured to:
if a dominant interfering channel is identified among the potential interfering channels, remove the other potential interfering channels from ACI detection,
wherein the dominant interfering channel has an energy greater than that of the other potential interfering channels by at least a first amount, and
wherein the respective energies of the other potential interfering channels are lower than that of the signal by at least a second amount.

21. A non-transitory computer-readable medium comprising an adjacent-channel interference (ACI) handling code for causing a wireless communication apparatus to:
receive a signal;
perform a single discrete Fourier transform (DFT) on the signal to generate frequency domain data;
determine respective energy of a plurality of adjacent channels of the signal utilizing the frequency domain data, comprising determining carrier-to-interference (C/I) corresponding to the adjacent channels;
determine one or more potential interfering channels among the adjacent channels, wherein each of the potential interfering channels has an energy greater than a qualifying threshold;
identify one or more dominant interfering channels from among the potential interfering channels; and
detect adjacent-channel interference (ACI) based on the one or more dominant interfering channels.

22. The computer-readable medium of claim 21, wherein the ACI handling code further causes the wireless communication apparatus to:
determine a variance of the energies of the adjacent channels; and
if the variance is less than a threshold, forgo ACI detection.

23. The computer-readable medium of claim 21, wherein the ACI handling code further causes the wireless communication apparatus to:
determine a peak to average ratio (PAR) of the signal utilizing the frequency domain data; and
detect a spur by comparing the PAR to a spur detection threshold.

24. The computer-readable medium of claim 23, wherein the ACI handling code further causes the wireless communication apparatus to:
if a spur is detected, force ACI detection to be false or remove the spur from the signal prior to detecting ACI.

25. The computer-readable medium of claim 21, wherein for identifying one or more dominant interfering channels, the ACI handling code further causes the wireless communication apparatus to, at least one of:
if a leakage is detected between two adjacent channels of the potential interfering channels, remove a weaker one of the adjacent channels from ACI detection; or
if a double sided ACI is detected, remove a weaker one of the potential interfering channels constituting the double sided ACI.

26. The computer-readable medium of claim 21, wherein for identifying one or more dominant interfering channels, the ACI handling code further causes the wireless communication apparatus to:
- if a dominant interfering channel is identified among the potential interfering channels, remove the other potential interfering channels from ACI detection,
- wherein the dominant interfering channel has an energy greater than that of the other potential interfering channels by at least a first amount, and
- wherein the respective energies of the other potential interfering channels are lower than that of the signal by at least a second amount.

* * * * *